(12) United States Patent
Kuepper et al.

(10) Patent No.: US 7,092,553 B2
(45) Date of Patent: Aug. 15, 2006

(54) MULTIMODAL BIOMETRY

(75) Inventors: Wolfgang Kuepper, Munich (DE); Matthias Schuster, Munich (DE)

(73) Assignee: Siemens Aktiengesellschaft, Munich (DE)

( * ) Notice: Subject to any disclaimer, the term of this patent is extended or adjusted under 35 U.S.C. 154(b) by 720 days.

(21) Appl. No.: 10/188,270

(22) Filed: Jul. 2, 2002

(65) Prior Publication Data

US 2003/0031348 A1 Feb. 13, 2003

(30) Foreign Application Priority Data

Jul. 3, 2001 (DE) ................. 101 32 013

(51) Int. Cl.
*G06K 9/00* (2006.01)

(52) U.S. Cl. ..................... 382/116; 340/5.52
(58) Field of Classification Search ............... 382/116
See application file for complete search history.

(56) References Cited

U.S. PATENT DOCUMENTS

| | | | |
|---|---|---|---|
| 5,533,177 A | | 7/1996 | Wirtz et al. |
| 5,621,809 A | * | 4/1997 | Bellegarda et al. ......... 382/116 |
| 5,751,843 A | | 5/1998 | Maggioni et al. |
| 5,828,779 A | | 10/1998 | Maggioni |
| 6,072,891 A | * | 6/2000 | Hamid et al. ............... 382/116 |
| 6,188,777 B1 | * | 2/2001 | Darrell et al. .............. 382/103 |
| 6,205,247 B1 | | 3/2001 | Breuer et al. |
| 6,990,217 B1 | * | 1/2006 | Moghaddam et al. ....... 382/118 |

FOREIGN PATENT DOCUMENTS

| | | |
|---|---|---|
| DE | 199 52 049 | 5/2001 |
| EP | 0 572 335 | 12/1993 |
| WO | WO 98/24051 | 6/1998 |
| WO | WO 98/25228 | 6/1998 |
| WO | WO 98/38533 | 9/1998 |
| WO | WO 98/50880 | 11/1998 |
| WO | WO 99/08223 | 2/1999 |

OTHER PUBLICATIONS

Lin Hong; "Integrating Faces and Fingerprints for Personal Identification", pp. 1-30.

(Continued)

*Primary Examiner*—Joseph Mancuso
*Assistant Examiner*—Damon M Conover
(74) *Attorney, Agent, or Firm*—Bell, Boyd & Lloyd LLC (57) ABSTRACT

A multimodal biometric method is provided for authenticating at least one user, in which at least one user is assigned to one of at least two classes, in which similarity measures are used that are measures of the similarity of biometric data, determined for the user, to reference data for one of the classes, in which a overall statistical statement on the user's membership of the class is present for each of the at least two classes as a function of the similarity measure, in which the overall statistical statement for each of the at least two classes results from the combination of the statistical statements of at least two individual biometries for the respective class, the statistical statements of the individual biometries being statistical statements on the user's membership of the class as a function of the similarity measures, and in which the user is assigned to one of at least two classes when a specific assignment criterion is fulfilled.

14 Claims, 7 Drawing Sheets

OTHER PUBLICATIONS

"SESAM: A biometric person identification system using sensor fusion", Dieckmann et al., pp. 827-833.

"Person identification Using Multiple Cues", Brunelli et al. vol. 17, No. 10, 1995.

"Multi-Modal Data Fusion for Person Authentication Using SVM", Yacoub, 1998.

Expert Conciliation for Multi Modal Person Authentication Systems by Bayesian Statistics, Bigun et al., pp. 327-334.

* cited by examiner

MULTIMODAL BIOMETRY

BACKGROUND OF THE INVENTION

Biometric methods can be applied to authenticate users; that is to say, the user is recognized by bodily features or characteristic modes of behavior. Multimodal biometry integrates two or more individual biometries (for example, speaker, signature, hand geometry, fingerprint, iris, face recognition) into an overall system. Biometric methods with individual biometries are disclosed, for example, in the form of dynamic signature verifications in WO 98/24051, WO 98/25228, WO 98/50880, WO 99/08223, in the form of a speaker verification in DE 19952049 A1, and as methods for hand recognition or for determining the position of a hand in U.S. Pat. Nos. 5,533,177, 5,751,843, 5,828,779, EP 0 560 779 B1, EP 0 713 592 B1, EP 0 800 145 A2 and WO 98/38533.

Multiple biometries can contribute to higher security and/or to enhanced comfort. The assignments for the individual biometries must be optimally combined or fused in this case.

The following requirements can be demanded in detail of a multimodal biometric system:

higher security than best individual biometry;

quick assignment time;

low and, in particular, prescribed average false acceptance rates FAR; and low and, in particular, prescribed average false rejection rate FRR.

Biometric methods are two-class assignment problems in which the features of the class of the originals (authorized users) are to be separated optimally from the features of the imposter class. Multimodal biometrics also constitute binary classification problems, the dimension of the feature space being a function of the number of the individual biometries used.

Various approaches exist for combining a number of individual biometries in a multimodal biometric method. These are:

Logic operation: AND-/OR-/combined operation; after Dieckmann, U. et al. "SESAM: A biometric person identification system using sensor fusion", Pattern Recognition Letters 18, 1997, pages 827–833.

Weighted total score: from individual scores or individual costs, for overall threshold; after Brunelli, R. und Falavigna, D. "Person Identification Using Multiple Cues", IEEE. Transactions on Pattern Analysis and Machine Intelligence, Vol. 17, No. 10, 1995.

Support vector machine (SEM): support vectors that separate the classes are determined by training process; after Ben-Yacoub, S. "Multi-Modal Data Fusion For Person Authentication Using SVM", IDIAP Research Report 98-07 Martigny-Valais-Suisse, 1998.

Bayesian statistics: normal distributions of the scores are presupposed; after Bigün E. S. et al. "Expert Conciliation for Multi Modal Person Authentication Systems by Bayesian Statistics", Proceedings 1st Int. Conf. On Audio-& Video-Based Personal Authentication, 1997, pages 327–334.

Neural networks (NN): data-driven class separation; after Brunelli, R. und Falavigna, D. "Person Identification Using Multiple Cues", IEEE. Transactions on Pattern Analysis and Machine Intelligence, Vol. 17, No. 10, 1995.

In all biometric methods, reference and test features are compared with one another, and a decision is made with the aid of similarity measures as to whether they originate from the same user. In other words, the similarity measures are measures of the similarity (correspondence) of biometric data determined for the user to reference data of users for the respective class. Measures of the similarity are either distances, so-called costs, between reference and test features or patterns, or so-called scores that constitute a measure of the probability that reference and test features originate from the same user. The value range of the costs lies between zero and a certain maximum value, low costs corresponding to high similarity, and high costs to low similarity. The values of the scores lie in the range between zero and one. Scores of one stand for maximum correspondence, and scores of zero for minimum correspondence.

With reference to the prior art, the combination of biometries via logic operations, which is chiefly used in the case of current commercial multimodal systems, may be explained by way of example. An AND operation is the logic combination of n biometries, a user being accepted only when for all individual biometries the costs ($K_1$, $K_2$, ..., $K_n$) lie below, or the scores ($S_1$, $S_2$, ..., $S_n$) lie above, specific thresholds ($T_1$, $T_2$, ..., $T_n$).

Logic AND operation criterion in the case of costs:

$$(K_1<T_1)\&(K_2<T_2)\& \ldots \&(K_n<T_n)$$

Logic AND operation criterion in the case of scores:

$$(S_1>T_1)\&(S_2>T_2)\& \ldots \&(S_n>T_n)$$

Figure 1:
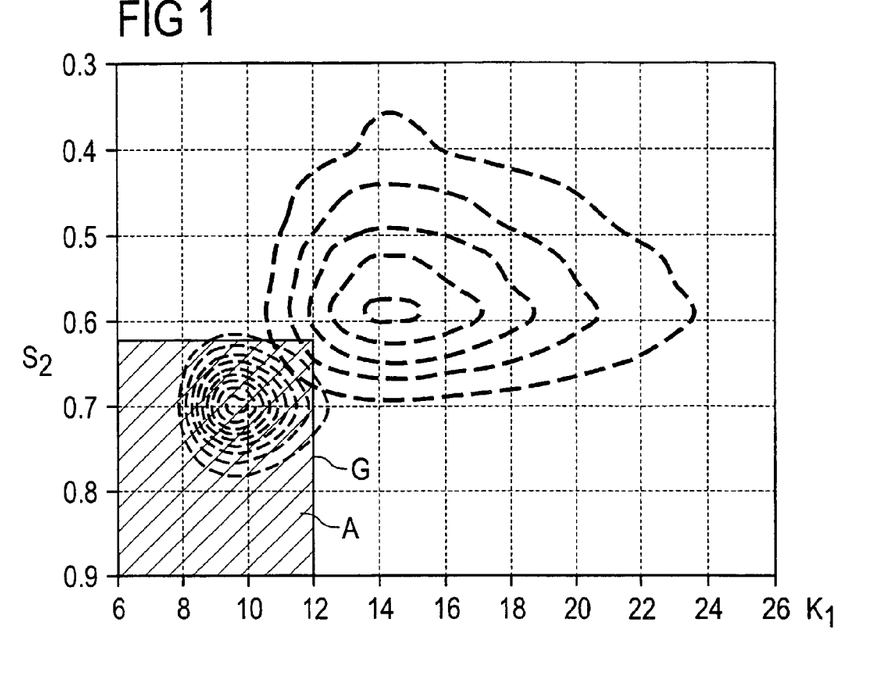
FIG. 1 shows a graph of the costs and scores in the case of a logic AND operation with a combination of two biometries 1 and 2, known in the prior art.

A possible assignment limit G and the associated acceptance region A (hatched region) of the costs and scores in the case of a logic AND operation for the combination of two biometrics 1 and 2 explained more accurately further below are illustrated in FIG. 1. The costs $K_1$ of the biometry 1 are plotted on the abscissa, and the scores $S_2$ of the biometry 2 are plotted on the ordinate.

In the case of the OR combination, in a biometry a user need generate only costs below, or scores above, a specific threshold value.

Logic OR operation criterion in the case of costs:

$$(K_1<T_1)|(K_2<T_2)| \ldots |(K_n<T_n)$$

Logic OR operation criterion in the case of scores:

$$(S_1>T_1)|(S_2>T_2)| \ldots |(S_n>T_n)$$

Figure 2:
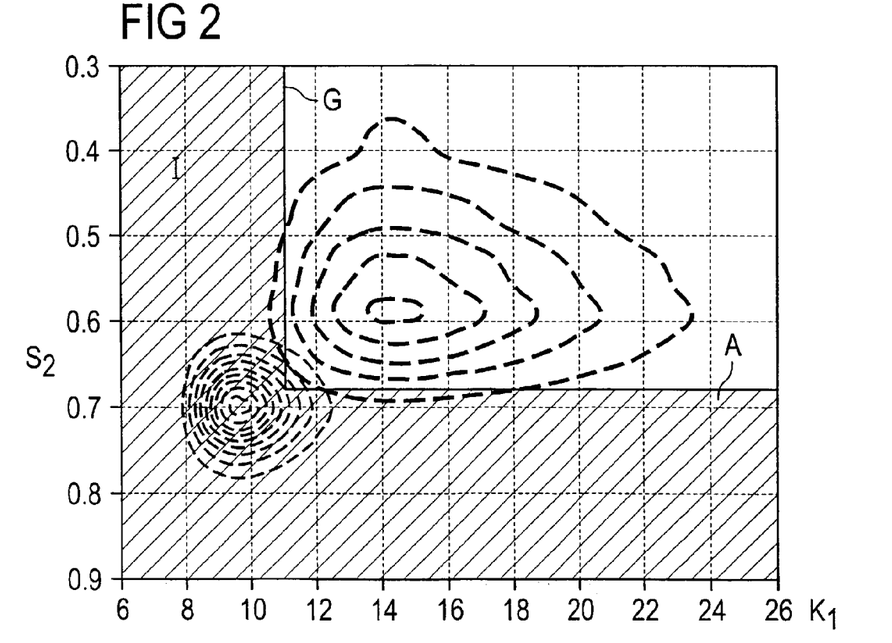
FIG. 2 shows a graph of the costs and scores in the case of logic OR operation for the combination of two biometries 1 and 2, known in the prior art.

An assignment limit G and the associated acceptance region A (hatched region) of the costs or scores in the case of a logic OR operation for the combination of biometry 1 and biometry 2 are shown, by way of example, in FIG. 2.

The existing approaches and systems partly exhibit a few disadvantages. These are concrete assumptions relating to the individual biometrics, for example, that costs of the individual biometries are normally distributed, a high training outlay (NN, SVM), inadequate error rates and difficult modification for the use of other biometrics, systems or another number of biometries, since the combinations such as, for example, weights in the case of the methods of weighted total scores are optimized to the systems and biometries used and to their number.

It is an object of the present invention to develop a multimodal biometry in the case of which the disadvantages outlined are avoided, and in the case of which, in particular, it is possible to set or select a desired false acceptance rate and, therefore, a certain degree of security.

SUMMARY OF THE INVENTION

In the case of the multimodal biometric method of the present invention, at least one user is assigned to one of at least two classes. These two classes are, in particular, the class of the originals and the imposter class.

Furthermore, use is made in the method of similarity measures that are measures of the similarity of biometric data, determined for the user, to reference data for one of the classes. The above explained costs and/or scores are particularly suitable as similarity measures.

An overall statistical statement is determined for the respective class from the combination of the statistical statements of at least two individual biometries. Like the overall statistical statement, the statistical statements of the individual biometries are statistical statements on the user's membership of the class as a function of the similarity measures.

The assignment of the user to the classes is now performed by comparing the overall statistical statements of the classes. When an assignment criterion that depends on the overall statistical statements is fulfilled, the user is assigned to one of the at least two classes.

By contrast with the previously outlined method, the statistical statements of the individual biometries are, therefore, firstly combined and then the resulting overall statistical statements are evaluated, instead of evaluating the statistical statements of the individual biometries first and then combining the results. As set forth further below, it is thereby possible to achieve substantially better results, and the multimodal biometric method can be adapted much more accurately to specific requirements.

The multimodal biometric method is preferably configured as a method for authenticating and/or determining the genuineness of the user. The two classes are then the class of the originals and the imposter class.

The statistical statement of an individual biometry is expediently a probability density. In this case, in particular, the combination of the statistical statements of at least two individual biometries from which the overall statistical statement results is the multiplication of the statistical statements for the individual biometries, given adequate statistical independence of the individual biometries.

The overall statistical statement is also expediently a probability density.

The similarity measures for an individual biometry include either costs or scores in each case for the purpose of easier calculation. However, there is no problem in making use for different individual biometries of different similarity measures of which one includes costs and the other scores.

The statistical statements and/or the overall statistical statements are expediently normalized for easier calculation.

A particular advantage of the method lies in the possibility of precisely and rationally controlling the assignment rates to specific classes and, thus, of controlling false acceptance rate FAR and/or the false rejection rate FRR. For this purpose, the prescribed value is selected so as to result in a desired assignment rate of users, corresponding to a desired false acceptance rate FAR and/or a desired false rejection rate FRR in relation to one of the at least two classes.

In a preferred formulation, starting from a prescribed ratio of the overall statistical statement on the user's membership of one of the at least two classes to the overall statistical statement on the user's membership of the other or to the others of the at least two classes, the user is assigned to one of the at least two classes. This ratio also can be formulated by appropriate algebraic conversions as a difference or another equivalent criterion.

In the case of this formulation, the prescribed value is equal, or approximately equal, to one in the simplest case.

Again, a particular advantage of the present invention lies, however, in the possibility of precisely and rationally controlling the assignment rates to specific classes and, thus, of controlling the false acceptance rate FAR and/or the false rejection rate FRR. For this purpose, the prescribed value is selected so as to result in a desired assignment rate of users, corresponding to a desired false acceptance rate FAR and/or a desired false rejection rate FRR, in relation to one of the at least two classes.

In another preferred formulation of the present invention, it is also possible to use another assignment criterion, as an alternative or an addition to the assignment criterion of the ratio of the overall statistical statement on the user's membership of one of the at least two classes to the overall statistical statement on the user's membership of the other or in the others of the at least two classes. This other criterion lies in that the user is assigned to one of the at least two classes when the overall statistical statement on the user's membership of this class exceeds a prescribed limiting value.

An additional application of this assignment criterion is suitable, in particular, when the false acceptance rate FAR is above a specific desired value in the case of sole application of the first mentioned criterion.

Finally, a third assignment criterion also can be applied as an alternative or an addition. This lies in that the user is assigned to one of the at least two classes when the overall statistical statement on the user's membership of the other or in the others of the at least two classes is below a prescribed limiting value.

As in the case of the first mentioned assignment criterion, a particular advantage also results for the two last-mentioned ones from the basic idea of the present invention firstly to calculate the statistical statements of the individual biometries and then to evaluate the overall statement. This lies in that the prescribed limiting value can be selected so as to result in a desired assignment rate, corresponding to a desired false acceptance rate FAR or a desired false rejection rate FRR. Moreover, this yields control of the method that supplies simple and rational results.

An arrangement that is set up to execute one of the outlined methods can be implemented, for example, by appropriately programming and setting up a computer or a computer system.

A program product for a data processing system that includes software code sections, with the aid of which one of the outlined methods can be executed on the data processing system, can be executed by suitably implementing the method in a programming language and translating into code that can be executed by the data processing system. The software code sections are stored for this purpose. A program product is understood in this case as the program as a product that can be traded. It can be present in any desired form such as, for example, on paper, a computer readable data medium or distributed over a network.

Additional features and advantages of the present invention are described in, and will be apparent from, the following Detailed Description of the Invention and the Figures.

DETAILED DESCRIPTION OF THE INVENTION

The method according to the present invention makes no assumption about the functional distribution of the costs or scores, but uses the measured distributions of costs or scores for the individual biometries. In the example illustrated here, a biometry 2, which is based on scores, and a biometry 1, which uses costs, are combined to form a multimodal biometry.

The basis of the method is formed by the multidimensional probability densities of the costs or scores for originals and imposters. These can be calculated on the measured cost distributions of the individual biometries.

Figure 3:
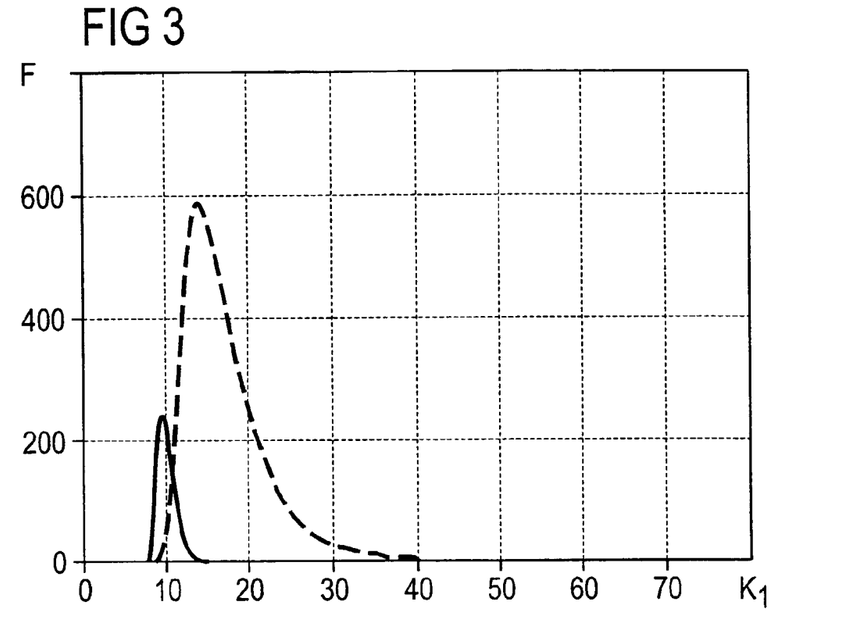
FIG. 3 shows an illustration of the costs of a biometry 1.
Figure 4:
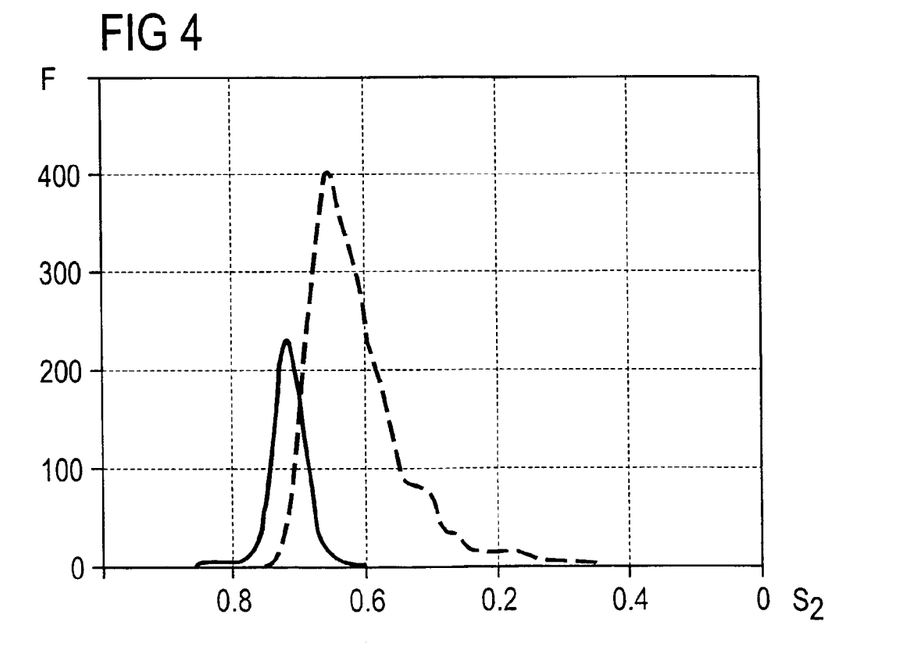
FIG. 4 shows an illustration of the scores of a biometry 2.

FIGS. 3 and 4 show, by way of example, for two different biometries the distributions of costs or scores of the originals (continuous line) and the imposters (dashed lines), which can be determined using use data. The frequency F (number) of the events is plotted as statistical statement on the costs $K_1$ of the biometry 1 or the scores $S_2$ of the biometry 2. The methods are explained below with the aid of this exemplary combination.

Figure 5:
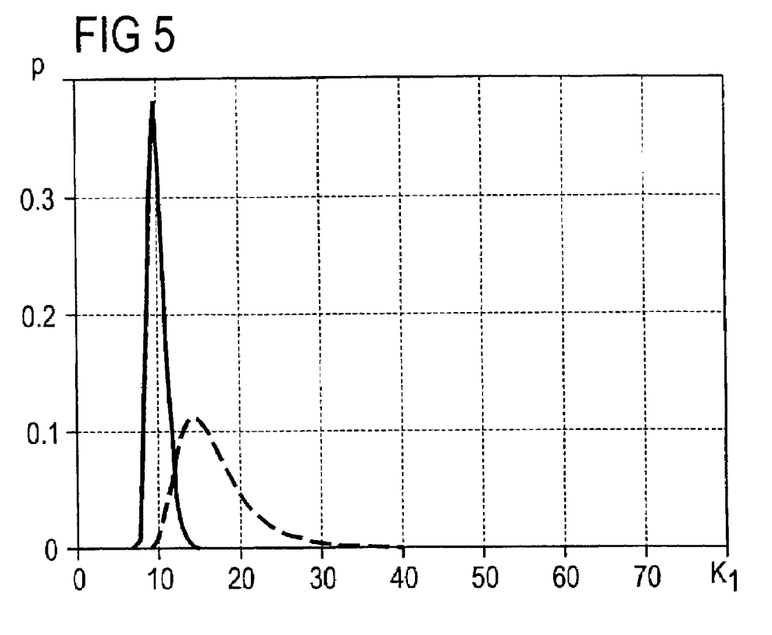
FIG. 5 shows the probability density of the costs of the biometry 1.
Figure 6:
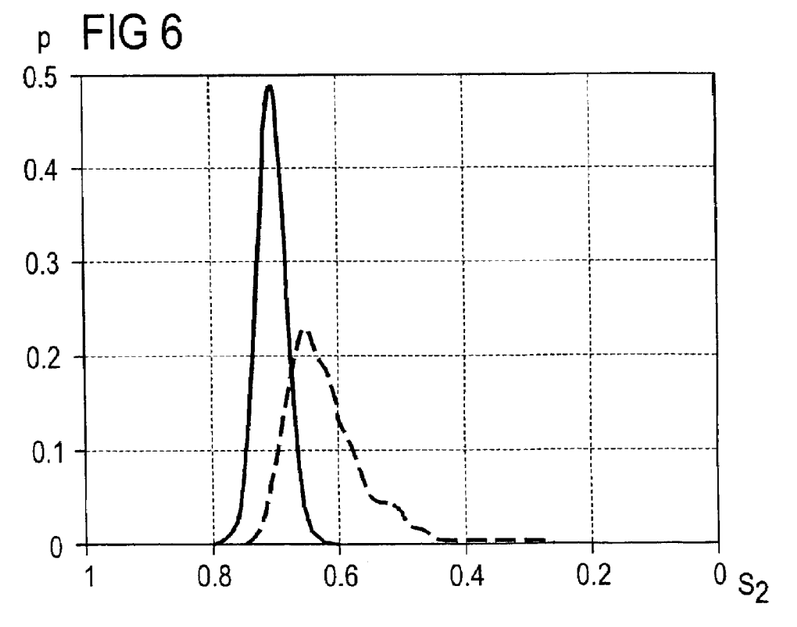
FIG. 6 shows the probability density of the scores of the biometry 2.

More suitable statistical statements are calculated for the individual biometries from these distributions of costs or scores in the form of probability densities of the similarity measures, which for their part are present in the form of costs or scores, by normalizing the integrals over the individual distributions to one. FIGS. 5 and 6 show these probability densities $p_o(x)$, $p_f(x)$ of the biometry 1 and $p_o(y)$, $p_f(y)$ of the biometry 2 for originals (continuous line) and imposters (dashed lines).

For statistically mutually independent biometries, the overall statistical statement in the form of the multidimensional probability density of the costs/scores for originals or imposters is the product of the probability densities of the individual biometries for originals and imposters. The assumption of statistical independence is adequately fulfilled for the biometrics listed in the introduction (for example, speaker, signature, hand geometry, fingerprint, iris, face recognition) as long as, for example, synchronously recorded mouth movement and speech are not combined. In the case of databases created by different populations, the assumption should always be fulfilled. It is then possible for all similarity measures (costs and/or scores) of one biometry to be combined with all the respective other biometry or biometrics, and for the suitable statistical individual statements to be combined to form an overall statement by multiplication of the probability densities.

Given n biometries, it is, however, also possible in any case simply to operate with the n-tuples of similarity measures and to obtain the n-dimensional overall probability density therefrom by enumeration. This method also holds for statistically dependent biometries; however, in this case it is only pairs or m-tuples (m less than or equal to n) measured jointly in each case that are combined.

In the case of statistical independence, all the values of one biometry may be combined with all the values of the other biometries, thus yielding an overall probability density that corresponds to the product of the individual probability densities.

In the continuous case, it holds for two statistically independent biometrics that:

$$p_o(x,y)=p_o(x) \cdot p_o(y) \text{ distribution of the originals}$$

$$p_f(x,y)=p_f(x) \cdot p_f(y) \text{ distributions of the imposters}$$

However, costs/score intervals are taken into account in the case of computer aided evaluations. Let M intervals be given for biometry 1 and N intervals for biometry 2. In this discrete case, use is made of a matrix $M_f$ for the probability density of the imposter costs/scores, and of a matrix $M_o$ for the probability density of the costs/scores of the originals:

$$M_o(m,n)=p_o(m) \cdot p_o(n) \text{ for } m=1, \ldots, M; n=1, \ldots N;$$

$$M_f(m,n)=p_f(m) \cdot p_f(n) \text{ for } m=1, \ldots, M; n=1, \ldots N;$$

Figure 7:
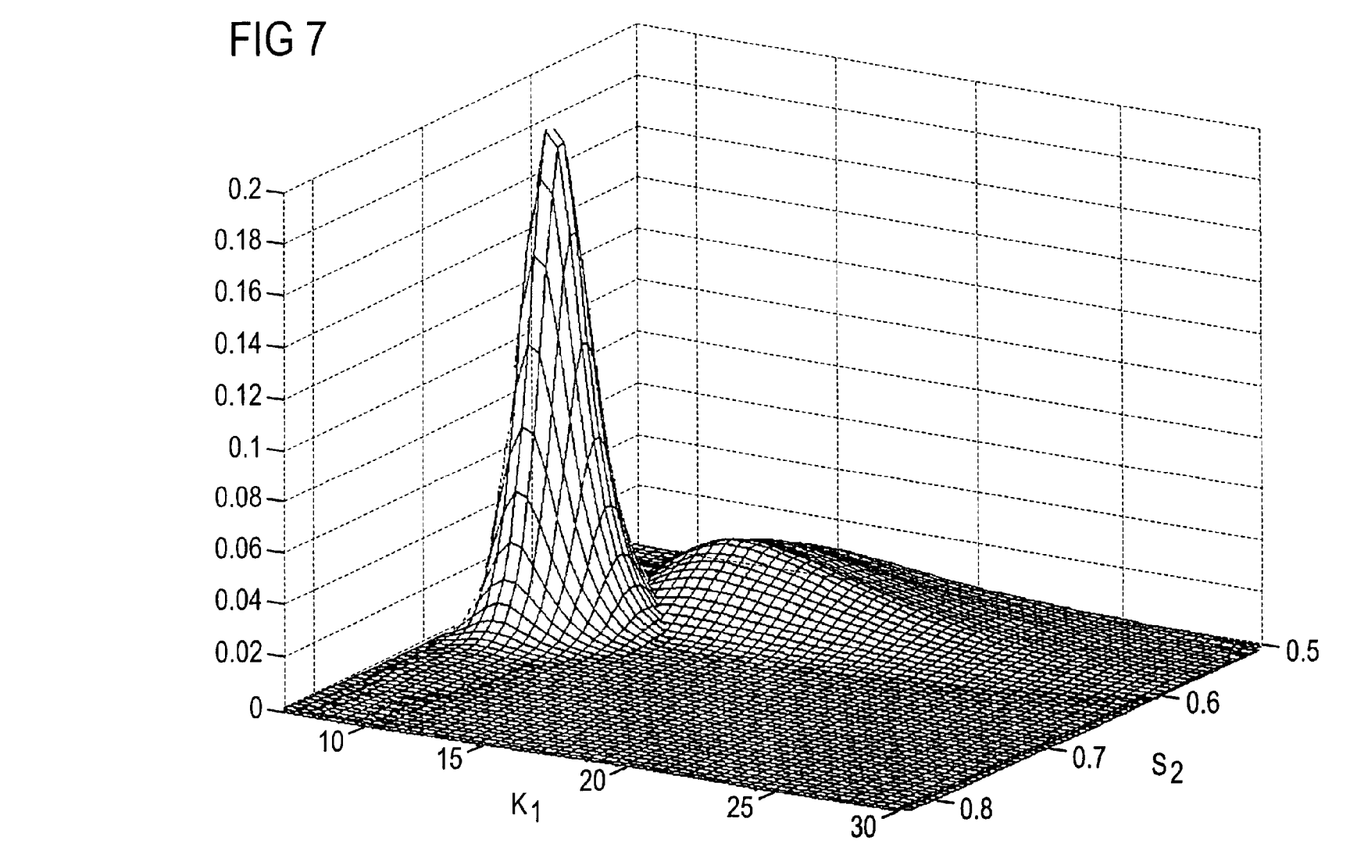
FIG. 7 shows two-dimensional probability densities of the similarity measurements of the originals and imposters for biometry 1 and biometry 2.

The two-dimensional probability densities of the similarity measurements for originals and imposters are shown in FIG. 7 for the combined biometries 1 and 2.

Figure 8:
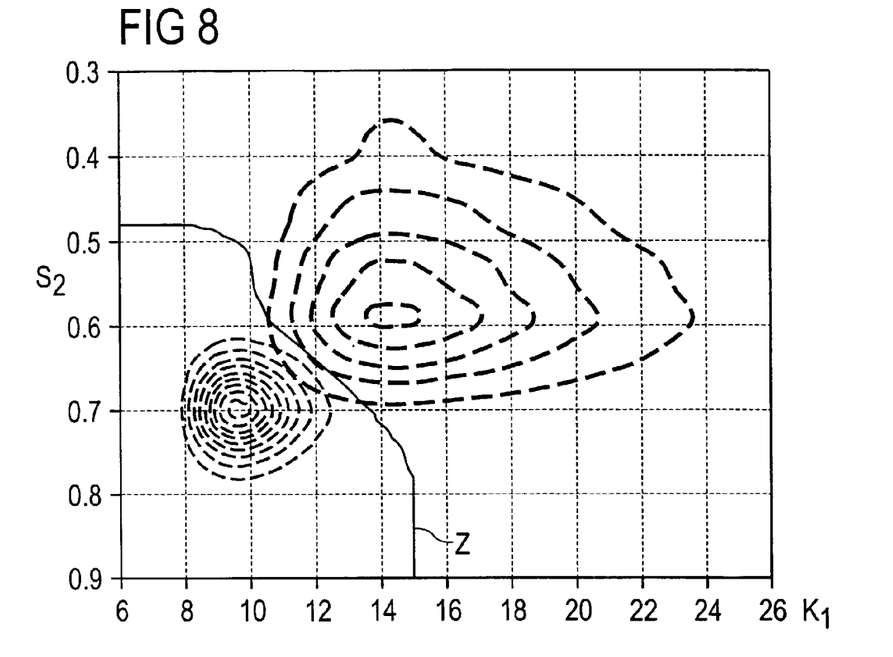
FIG. 8 shows the membership limit.

The curve of a dissection of the two probability density distributions is the membership limit. At these locations, the probability of a point of the similarity measurements belonging to the class of imposters is equal to the probability of belonging to the class of originals:

$$M_o(m,n)=M_f(m,n) \text{ membership limit}$$

This membership limit Z is illustrated in FIG. 8 for the biometry 1 and biometry 2. Also shown are lines of constant probability density of the similarity measurements of the originals (dotted lines) and imposters (dashed lines).

The multimodal biometric method uses various assignment criteria that are based on the multidimensional probability densities of the similarity measurements of the imposters and originals. These membership criteria can be applied alternatively or simultaneously.

The first assignment criterion is the membership of one of the two distributions. A cost/score point in multidimensional space is assigned in this case to that distribution which has the higher probability density at this point. The assignment limit is, therefore, the membership limit.

In the case of two biometries, a similarity point with co-ordinates (m, n) is assigned to the group of the originals when it holds that:

$$M_o(m,n) > M_f(m,n) \text{ assignment criterion I.}$$

This corresponds to the statement that the user is assigned to the class of the originals when the ratio of the overall statistical statement on the user's membership of the class of the originals to the overall statistical statement on the user's membership of the class of the imposters exceeds the prescribed value one.

The $FAR_I$ and the $FRR_I$ can be determined for this first assignment criterion I with the aid of the test data.

If $FAR_I$ is above a prescribed maximum FAR desired value $FAR_{Soll}$, the fulfilment of an additional assignment criterion IIa can be demanded. A cost/score point (m, n) is then assigned in this case to the group of the originals only when the assignment criterion I is fulfilled and the probability density of the costs/scores of the imposters $M_f(m,n)$ is below a specific limit $P_{f,grenz}$ here:

$M_f(m,n) < p_{f,grenz}$ assignment criterion IIa.

This limit is fixed in this case such that the prescribed $FAR_{soll}$ is set up in the case of the test data. The assignment limit of this assignment criterion IIa is, therefore, a line of constant probability density of the costs/scores of the imposters.

Figure 9:
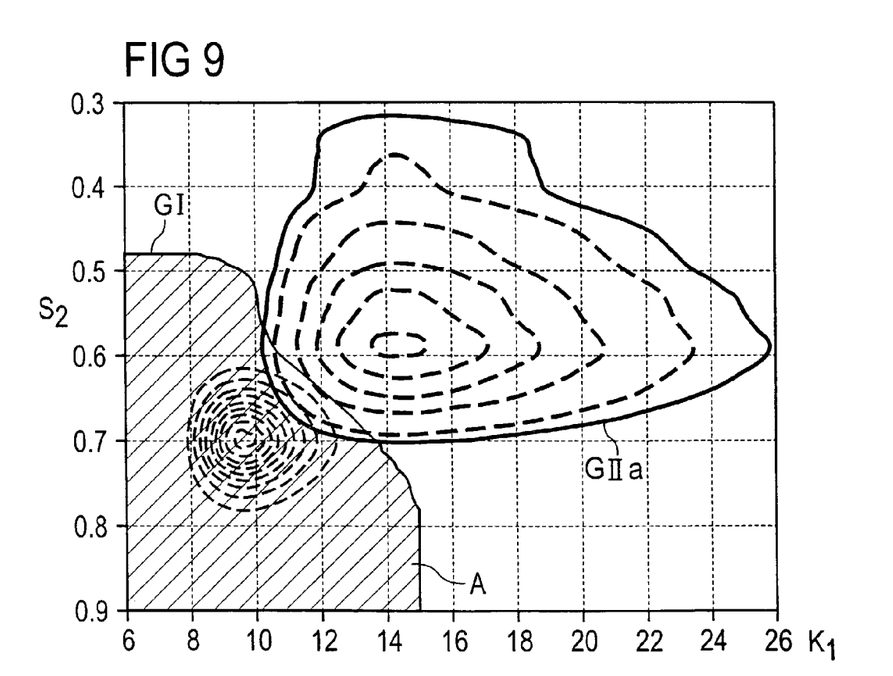
FIG. 9 shows assignment limits in the case of assignment criteria I and IIa.

By way of example, FIG. 9 shows for biometrics 1 and 2 the assignment limits G I and G IIa, and the cost/score region A (hatched) within which a user is authenticated given a relatively rigorously prescribed $FAR_{soll}$.

If the determined $FAR_I$ is smaller than the prescribed $FAR_{soll}$, an assignment criterion IIb is used instead of assignment criterion IIa. A cost/score point with co-ordinates (m,n) is then assigned to the group of the originals only when either the assignment criterion I is fulfilled, or the probability density of the costs/scores of the originals $M_o((m,n)$ are above a specific limit $p_{o,grenz}$ here:

$M_o(m,n) > p_{o,grenz}$ assignment criterion IIb.

This limit is fixed in this case such that the prescribed false acceptance rate $FAR_{soll}$ is set up in the case of the test data. The assignment limit of this assignment criterion IIb is, therefore, a line of constant probability density of the costs and/or scores of the originals.

Figure 10:
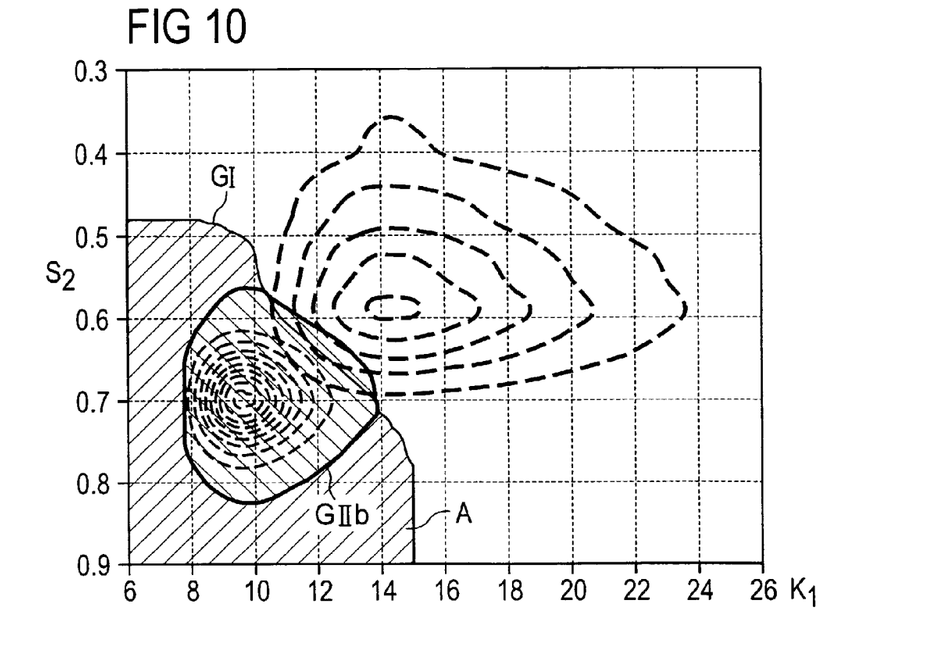
FIG. 10 shows assignment limits in the case of assignment criteria I and IIb.

FIG. 10 shows the assignment limits G I, G IIb and the acceptance region A for the combination of biometries 1 and 2 in the case of a less rigorous demand on the false acceptance rate $FAR_{soll}$.

Figure 11:
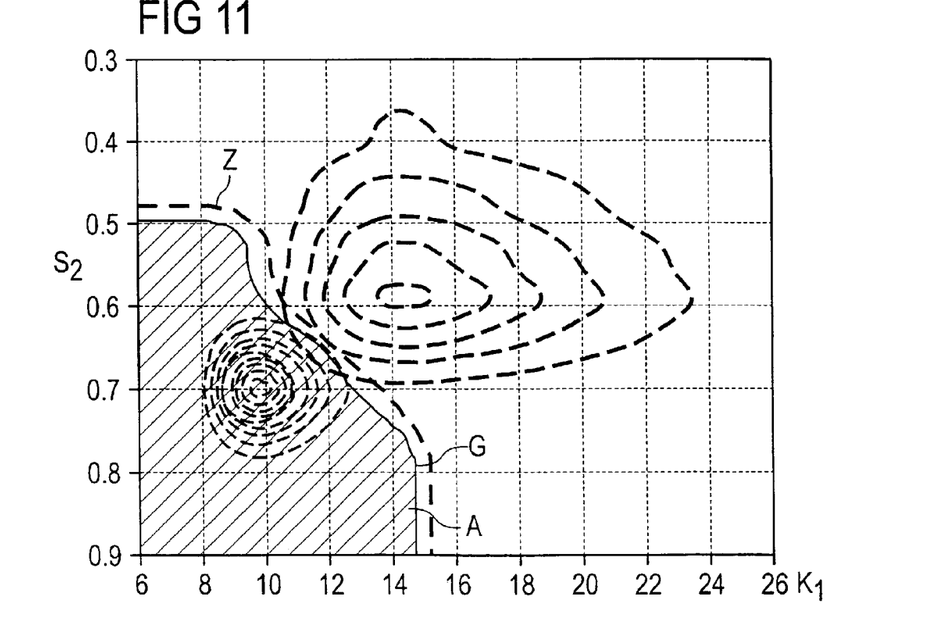
FIG. 11 shows an assignment limit in the case of a prescribed value V.

Instead of selecting as assignment limit according to the assignment criterion I (the line for which the ratio has the prescribed value one), it is also possible to use those curves for which the ratio of the two probability densities has an arbitrary prescribed value V. This prescribed value V is selected in this case such that a prescribed false acceptance rate $FAR_{soll}$ is set up for the test data. A cost/score point with co-ordinates (m,n) is assigned in this case to the group of the originals when it holds that:

$$\frac{M_o(m, n)}{M_f(m, n)} > V.$$

The assignment limit G and acceptance region A of this method are illustrated in FIG. 11, by way of example, with the combination of biometry 1 and biometry 2 in the case of a relatively rigorously prescribed false acceptance rate $FAR_{soll}$. The membership limit Z corresponds to a ratio with the prescribed value V=1. The assignment limit G falls short of or exceeds the membership limit Z, depending on which ratio results on the basis of the probability densities and the prescribed $FAR_{soll}$.

The methods use the distribution of the costs/scores of the individual biometrics as a basis for multimodal classification. Data of the individual biometries are required in sufficient quantity in order to calculate the multidimensional probability densities and the values for setting up the prescribed FAR. Both methods determine acceptance regions for a combination of a number of biometries, with the secondary condition of a prescribed average FAR desired value. Depending on the data and the structure, resulting therefrom, of the probability densities, a number of spatially separate acceptance regions also may arise in the case of these methods. There is an examination in one verification step as to whether the costs/scores of the individual biometries of a user are inside the desired FAR within the acceptance region for this combination, and thus decide on acceptance or rejection of the user.

Figure 12:
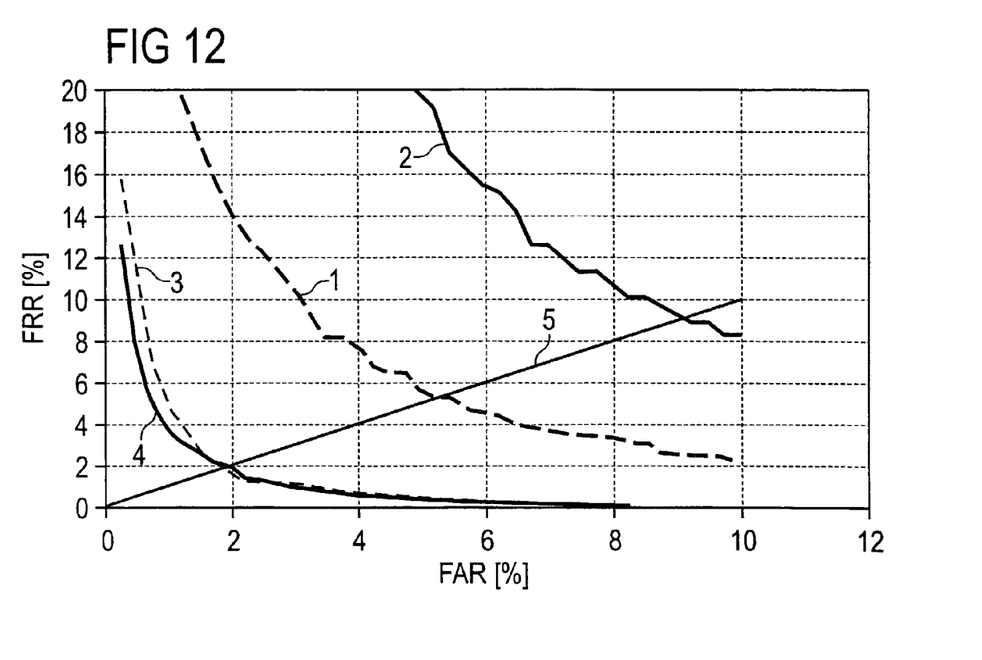
FIG. 12 shows a comparison of the individual biometries with the multimodal methods according to the present invention.

The multimodal classification methods presented are tested for a combination of two exemplary biometries. It is determined for different desired values of the FAR what are the resulting values of the FRR of the individual biometries and the multimodal methods presented here. These error rates are illustrated in FIG. 12. Curve 1 stands in this case for the use of the biometry 1 as individual biometry, curve 2 for the use of the biometry 2 as individual biometry, curve 3 for the use of the method according to the present invention with a prescribed value V=1 and an additional limiting value in accordance with assignment criterion IIa or IIb, curve 4 for the method with a setable prescribed value V, and curve 5 for the EER line. It is to be seen that, given the same FAR values, the multimodal methods exhibit really lower FRR values than do the two individual biometries.

The methods according to the present invention exhibit relatively similar profiles of the error rates, given very small FAR desired values the method with a prescribed value V=1 and an additional limiting value generating somewhat smaller false rejection rates than does the method with a setable prescribed value V. In the case of the multimodal methods, the EER is clearly below the EER of the two individual biometries.

Figure 13:
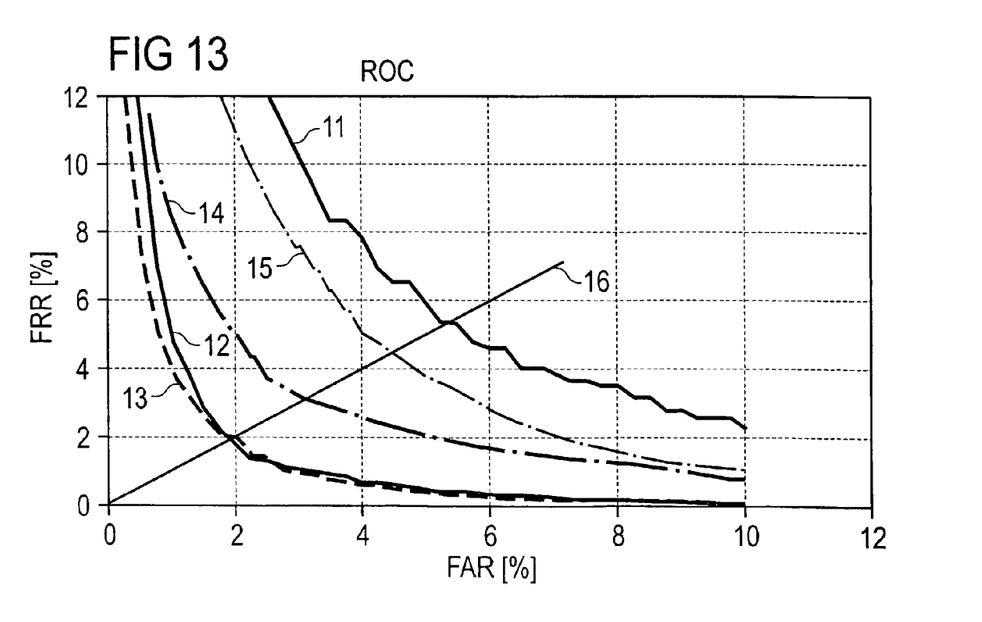
FIG. 13 shows a comparison of multimodal methods.

Finally, the biometric methods according to the present invention and presented here are to be compared with the AND or OR operations, described in the beginning, according to the prior art. Illustrated in FIG. 13, as a function of the prescribed FAR desired value, are the false rejection rates of the biometry 1 (as best individual biometry, curve 11), of the method according to the present invention with a prescribed value V=1 and additional limiting value (curve 12), of the method according to the present invention with a setable prescribed value V (curve 13), of the respective best AND operation (curve 14) and of the respective best OR operation (curve 15), and this corresponds to an ROC (Receiver Operating Characteristic) diagram. Curve 16 is the EER line. It is to be seen that the biometric methods according to the present invention exhibit clearly better properties with reference to the error rates than do the logic operations and the individual biometries.

The multimodal biometric methods according to the present invention are to be preferred because of their low error rates. The basis for this method is the membership of cost/score points in the class of the originals or imposters. In the simplest case, therefore, the assignment limit is the curve of intersection of the two probability densities. If this criterion does not suffice for a specific $FAR_{soll}$, then, particularly in the case of the method with a prescribed value of V=1, the regions of the imposter costs are excluded, or the costs/scores of the originals which exhibit a relatively high probability density beyond the membership limiting line are incorporated until the FAR is reached. In the case of the method according to the present invention with a setable prescribed value V, the modified membership condition for a specific $FAR_{soll}$ is determined by varying the ratio of the probability densities. The somewhat better results of the last named method are to be explained by virtue of the fact that both probability density distributions are incorporated here when setting the desired FAR, and regions in which the probability density of the imposters is relatively high and that of the originals relatively low are excluded for the purpose of achieving smaller FAR values.

Two biometries are combined in the example illustrated. However, it is also possible to combine a number of biometries with one another via the method according to the present invention.

The advantages of the multimodal biometric methods according to the present invention are:
- global false acceptance rate FAR that can be permanently set;
- low resulting false rejection rates FRR;
- simple integration of different biometries and systems (also of different manufacturers);
- combination of two and more biometries is possible;
- calculation with real distributions of the similarity measurements, that is say no restrictive assumptions;
- fast assignment time, since only one regional comparison need be carried out; and
- applicability in the case of all conceivable similarity measures such as costs, scores and their combinations.

Although the present invention has been described with reference to specific embodiments, those of skill in the art will recognize that changes may be made thereto without departing from the spirit and scope of the present invention as set forth in the hereafter appended claims.

The invention claimed is:

1. A multimodal biometric method, comprising the steps of:
    assigning at least one user to one of at least two classes, the assignment criterion being selected so as to produce a desired assignment rate of users to one of the at least two classes;
    using similarity measures of biometric data, determined for the user, to reference data for the respective class;
    presenting an overall statistical statement on the user's membership of the class for each of the at least two classes as a function of the similarity measures, wherein the overall statistical statement for each of the at least two classes results from a combination of the statistical statements of at least two individual biometries for the respective class, the statistical statements of the individual biometries being statistical statements on the user's membership of the class as a function of the similarity measures; and
    assigning the user to one of the at least two classes when an assignment criterion is fulfilled that depends on the overall statistical statements,
    wherein the assignment criterion is fulfilled when a ratio of the overall statistical statement on the user's membership of the one of the at least two classes to the overall statistical statement on the user's membership of the other of the at least two classes exceeds a prescribed value.

2. A multimodal biometric method as claimed in claim 1, wherein the user is authenticated by the method.

3. A multimodal biometric method as claimed in claim 1, wherein at least one of the statistical statements of an individual biometry results from at least one of enumerating and interpolating measured data.

4. A multimodal biometric method as claimed in claim 1, wherein the overall statistical statement results from at least one of enumerating and interpolating the statistical statements of the individual biometries.

5. A multimodal biometric method as claimed in claim 1, wherein at least one of the statistical statements is a probability density.

6. A multimodal biometric method as claimed in claim 1, wherein the combination of the statistical statements of at least two individual biometries from which the overall statistical statement results is a multiplication.

7. A multimodal biometric method as claimed in claim 1, wherein the similarity measures include at least one of costs and scores.

8. A multimodal biometric method as claimed in claim 1, wherein at least one of the statistical statements and the overall statistical statements are normalized.

9. A multimodal biometric method as claimed in claim 1, wherein the prescribed value is approximately equal to one.

10. A multimodal biometric method as claimed in claim 1, wherein the prescribed value is selected so as to result in a desired assignment rate of users to one of the at least two classes.

11. A multimodal biometric method as claimed in claim 1, wherein the assignment criterion is fulfilled when the overall statistical statement on the user's membership of the one of the at least two classes exceeds a prescribed limiting value.

12. A multimodal biometric method as claimed in claim 11, wherein the limiting value is selected so as to result in a desired assignment rate of users to one of the at least two classes.

13. A program product for a data processing system that includes a computer-readable medium containing computer executable code for performing a multimodal biometric method on the data processing system, the program product comprising:
    computer executable code for assigning at least one user to one of at least two classes, the assignment criterion being selected so as to produce a desired assignment rate of users to one of the at least two classes;
    computer executable code for using similarity measures of biometric data, determined for the user, to reference data for the respective class;
    computer executable code for presenting an overall statistical statement on the user's membership of the class for each of the at least two classes as a function of the similarity measures, wherein the overall statistical statement for each of the at least two classes results from a combination of the statistical statements of at least two individual biometrics for the respective class, the statistical statements of the individual biometries being statistical statements on the user's membership of the class as a function of the similarity measures; and
    computer executable code for assigning the user to one of the at least two classes when an assignment criterion is fulfilled that depends on the overall statistical statements, wherein the assignment criterion is fulfilled when a ratio of the overall statistical statement on the user's membership of the one of the at least two classes to the overall statistical statement on the user's membership of the other of the at least two classes exceeds a prescribed value.

14. A data processing system for executing a multimodal biometric method, wherein the method comprises the steps of assigning at least one user to one of at least two classes, the assignment criterion being selected so as to produce a desired assignment rate of users to one of the at least two classes, using similarity measures of biometric data, determined for the user, to reference data for the respective class, presenting an overall statistical statement on the user's membership of the class for each of the at least two classes as a function of the similarity measures, with the overall statistical statement for each of the at least two classes resulting from a combination of the statistical statements of at least two individual biometries for the respective class, the statistical statements of the individual biometries being statistical statements on the user's membership of the class as a function of the similarity measures, and assigning the user to one of the at least two classes when an assignment criterion is fulfilled that depends on the overall statistical statements, wherein the assignment criterion is fulfilled when a ratio of the overall statistical statement on the user's membership of the one of the at least two classes to the overall statistical statement on the user's membership of the other of the at least two classes exceeds a prescribed value.

* * * * *